United States Patent [19]

Leys

[11] Patent Number: 5,024,780

[45] Date of Patent: Jun. 18, 1991

[54] CLEANER FOR TREATING A SURFACE

[75] Inventor: Cassius W. Leys, Hartsdale, N.Y.

[73] Assignee: A.G.P. Systems, Inc., Windham, N.Y.

[21] Appl. No.: 400,564

[22] Filed: Aug. 30, 1989

[51] Int. Cl.$^5$ .......................... C09D 9/00; C11D 7/22; C11D 7/50

[52] U.S. Cl. .................... 252/162; 252/170; 252/171; 252/172; 252/314; 252/DIG. 8; 252/153; 252/542; 134/38

[58] Field of Search ............... 252/162, 170, 171, 172, 252/364, DIG. 8, 153, 542; 134/38

[56] References Cited

U.S. PATENT DOCUMENTS

| | | | |
|---|---|---|---|
| 4,508,634 | 4/1988 | Elepano et al. | 252/163 |
| 4,664,721 | 5/1987 | Valasek | 134/26 |
| 4,780,235 | 10/1988 | Jackson | 252/170 |
| 4,836,950 | 6/1989 | Madsen | 252/153 |

FOREIGN PATENT DOCUMENTS 0007628 12/1987 World Int. Prop. O.

Primary Examiner—Jacqueline V. Howard
Assistant Examiner—James M. Silbermann
Attorney, Agent, or Firm—Grimes & Battersby

[57] ABSTRACT

The present cleaner removes graffiti, paint and other coatings, if any, from a surface. The cleaner comprises N-methylpyrrolidone; propylene carbonate; hydroxy propyl cellulose thixotropic thickening agent; an ingredient selected from the group consisting of diethylene glycol monoethyl ether acetate, dipropylene glycol monomethyl ether acetate, dipropylene glycol methyl ether, diethylene glycol ethyl ether and isocetyl alcohol; and a surfactant.

14 Claims, No Drawings

CLEANER FOR TREATING A SURFACE

BACKGROUND OF THE INVENTION

1. Field of the Invention

The present invention relates generally to a cleaner for treating a surface. More particularly, the present invention relates to such a cleaner which removes graffiti from certain desired protective coated or painted surfaces without damage to that protective coat and without altering the surface. In untreated surfaces, such a cleaner shall remove unwanted paint and graffiti without damage to the surface. Further, such a cleaner has been found to be effective in cleaning and removing paint and finish from furniture.

In recent years there has been an increased concern over the rapidly growing problem of graffiti, particularly in urban areas. In modern times, the term graffiti has come to acquire a meaning which differs substantially from it's historical meaning. The modern observer views graffiti not as an art form, but rather, as a form of destruction and vandalism.

The application of graffiti and other unwanted paint or coatings on a surface has become most prevalent in institutions, such as, schools, public and private buildings, automobiles, trucks, train cars and rest rooms which are available to the public at large. Graffiti is even more problematic in open areas, such as, support walls and piers, bridges, retaining walls, sound barriers, the exterior walls of buildings, various structures in parks, which incidentally were put there in the first place to cosmetically improve the parks and the like. The vast majority of such graffiti are color markers having pigmented dyes with fast drying, penetrating solvents and oil based paints including enamels, epoxies, lacquers and urethanes. The graffiti is usually applied by spray cans, and is applied to various types of surfaces.

2. Description of the Prior Art

The methods for the removal of graffiti and unwanted paint, which for the most part are cost prohibitive, have heretofore included sandblasting, hydrosanding and hydroblasting the surfaces on which the graffiti appears. These methods often involve a subsequent re-painting of the surface to restore its aesthetically pleasing appearance since sandblasting, hydrosanding and hydroblasting make a surface porous and rough. Depending on the nature of the surface, such methods could have a potentially deleterious effect to the surface. For example, such methods can etch or score the surface thereby creating a degree of porosity which assists in holding later applied graffiti to the surface, as well as to any area in close proximity, and sandblasting will emit potentially carcinogenic and siliceous particles into the air.

Another method which has been used for removal of graffiti and unwanted paint includes chemical treatment of the surface on which the graffiti appears, such as acids and caustic solutions. This method has proven costly and unsuccessful. It has been found that repetitive chemical cleaning treatment quickly destroys the painted surface thereby necessitating frequent repainting. The application of such strong chemical cleaners also has a deleterious effect to the surrounding environment and on the person applying the chemicals. Further, some of the chemicals are now either banned as pollutants to the environment or, perhaps, in the process of being banned.

Perhaps the most common way of removing graffiti is to repaint the surface and hope that the same individuals who had applied the original graffiti do not take the repainting as a new invitation to refine their art skills. As can be appreciated, this approach is perhaps the least effective. It requires the use of a paint which is capable of covering the graffiti without bleed through of the underlying graffiti.

U.S. Pat. No. 4,716,056, which issued on Dec. 29, 1987 to Frank Fox and Cassius W. Leys, the latter being the inventor of the present invention, relates to a system for treating a surface and discusses therein non-toxic cleaners which are particularly adaptable for removal of graffiti. A particularly preferred cleaner set forth in this patent comprises: 28% toluene, 10% methyl ethyl ketone, 13% xylene, 2% ethylene glycol n-butyl ether, 10% methylene chloride, 15% propane, 15% isopropanol, 2% methanol and 5% o-dichlorobenzene. The drawbacks of this formula is that the methylene chloride lifts the paint off in large scabs instead of emulsifying the paint into a water soluble emulsion as in the present invention. Further, methylene chloride leaves a residue on the surface to be cleaned. Methylene chloride, furthermore, has been banned in some states due to its toxicity and has been classified as a hazardous chemical by the Occupational Safety and Health Administration (O.S.H.A.) and the Environmental Protection Agency (E.P.A.).

Other cleaners, such as AGP Wipe-Away by AGP Systems, Inc., the assignee of the present application, remove graffiti, but do not act as effectively and with the very low volatile organic compounds (V.O.C.) as the cleaner of the present invention. Further such cleaners are not water soluble, biodegradable and nonflammable.

SUMMARY OF THE INVENTION

Against the foregoing background, it is a primary object of the present invention to provide a cleaner for treating a surface to remove graffiti and other undesired paint, especially when the surface is protected with an anti-graffiti coating or paint.

It is another object of the present invention to provide such a cleaner which removes graffiti from a surface that does not have thereon any anti-graffiti protective coating.

It is yet another object of the present invention to provide such a cleaner which is water soluble, biodegradable, nonflammable and has low toxicity and very low volatile organic compounds V.O.C.

It is still another object of the present invention to provide such a cleaner which needs one coat to remove the undesired paint and graffiti, and which can be washed completely off the treated surface with water.

It is still yet another object of the present invention to provide such a cleaner which leaves behind virtually no residue.

It is still yet another object of the present invention to provide such a cleaner which on furniture and wood surfaces acts as a finish or paint remover that is water soluble, biodegradable and can be rinsed or washed off with water.

It is yet still another object of the present invention to provide such a cleaner which can be applied by brush, spray or wiped on and can be used for all types of materials, such as brick, masonry, stone, metal, plaster board and wood.

To the accomplishments of the foregoing objects and advantages, the present invention, in brief summary, includes a cleaner for treating both a treated surface and, in most situations, an untreated surface to remove undesired graffiti or paint which cleaner comprises: (a) N-methylpyrrolidone, (b) propylene carbonate, (c) thixotropic thickening agent, (d) an ingredient selected from the group consisting of diethylene glycol monoethyl ether acetate, dipropylene glycol monomethyl ether acetate, dipropylene glycol methyl ether, diethylene glycol ethyl ether and isocetyl alcohol, and (e) a surfactant. In a preferred embodiment, an odor masking additive is also included in order to abate odors.

DESCRIPTION OF THE PREFERRED EMBODIMENTS

The cleaner of the present invention is particularly adapted for use on most surfaces generally susceptible to the application of graffiti or undesired paint including, for example, masonry, stone, metal, plaster board and treated and untreated wood. Such masonry surfaces may include cement, cement blocks, concrete, brick, mortar and the like, while such metal surfaces include aluminum and steel. The present cleaner is particularly adaptable for use on steel structures such as bridges, buildings, highway underpasses and overpasses, statues, walls and the like, and for removing paint coatings from equipment and machinery.

The cleaner basically comprises three active ingredients, a thickening agent and a surfactant. In particular, the cleaner composition includes: N-methylpyrrolidone; propylene carbonate; an active ingredient selected from the group consisting of diethylene glycol monoethyl ether acetate, dipropylene glycol monomethyl ether acetate, dipropylene glycol methyl ether, diethylene glycol ethyl ether and isocetyl alcohol; and proprietary additives which include a hydroxy propyl cellulose thickening agent and a surfactant. More particularly, the composition comprises: N-methylpyrrolidone in an amount between about 20 to about 40 percent by volume of the total composition; propylene carbonate in an amount between about 20 to about 50 percent by volume; hydroxy propyl cellulose thickening agent in an amount between about 0.5 to about 1.0 percent by volume; a surfactant, such as for example ethoxylated nonyl phenol known also as Tritan N-100 or x-100, in an amount between about 1.6 to about 2.4 percent by volume; and the active ingredient selected from the group consisting of diethylene glycol monoethyl ether acetate, dipropylene glycol monomethyl ether acetate, dipropylene glycol methyl ether, diethylene glycol ethyl ether and isocetyl alcohol in the remaining amount by volume of the total composition. The cleaner may also contain a propellant. The preferred propellant is carbon dioxide since it is non-flammable.

N-methylpyrrolidone, which is one active ingredient of the present cleaner composition, is a water soluble material. This particular water soluble material has been found to have excellent paint remover properties. N-methylpyrrolidone is sold under the trademark M Pyrol by GAF.

It is believed that the N-methylpyrrolidone can be used in the cleaner composition in an amount between about 20 to about 40 percent, however it is preferred that the N-methylpyrrolidone be about 32.00 percent of volume of the total cleaner composition. It has been found that above 40 percent the N-methylpyrrolidone is much too expensive to use and below 20 percent it does not provide the favorable results achieved within the range.

Propylene carbonate is the second active ingredient. It is available through Arco Chemicals Propylene carbonate should be provided in the cleaner composition in an amount between about 20 to about 50 percent by volume of the total composition. Below 20 percent and above 50 percent the propylene carbonate is not as effective as in the recited range because it acts too slowly. It is preferred that the propylene carbonate be present in an amount about 31.8 percent by volume of the total cleaner composition.

It is believed that the above two specific active ingredients are needed for the present cleaner composition to be effective. It is also believed that to achieve optimum results a third active ingredient is needed. Five chemicals or materials have been found to work effectively as the third active ingredient. These five materials comprise four glycols and isocetyl alcohol.

One of the glycol materials is diethylene glycol monomethyl ether acetate. This material readily disperses both the N-methylpyrrolidone and the propylene carbonate in the cleaner composition. A second such material is dipropylene glycol monomethyl ether acetate.

When either diethylene glycol monomethyl ether acetate or dipropylene glycol monomethyl ether acetate is used in the cleaner composition, the cleaner is extremely effective in removing graffiti from any surface. Further, these two active ingredients have the advantage of having a very high boiling point and an exceeding low evaporation rate. This is significant since with these properties the resulting cleaner becomes a very low volatile organic compound (V.O.C.) cleaner which is well below presently acceptable V.O.C. regulatory levels.

The other two glycol materials are dipropylene glycol methyl ether and diethylene glycol ethyl ether. Dipropylene glycol methyl ether and diethylene glycol ethyl ether are basically the same chemicals as diethylene glycol monomethyl ether acetate and dipropylene glycol monomethyl ether acetate. However, the former two have a faster evaporative rate than the latter two so in effect they provide much higher V.O.C. factors, which are undesirable, in the present cleaner composition. Further, dipropylene glycol methyl ether and diethylene glycol ethyl ether each has a boiling point lower than diethylene glycol monomethyl ether acetate and dipropylene glycol monomethyl ether acetate again contributing to undesired V.O.C. factors in the resultant cleaner.

Thus, the use of diethylene glycol monomethyl ether acetate and dipropylene glycol monomethyl ether acetate are preferred since they are more stable, i.e. they have a slower evaporation rate and, therefore, are more desirable environmentally. However, dipropylene glycol methyl ether and diethylene glycol ethyl ether will work effectively in the cleaner formulas of the present invention.

Isocetyl alcohol, the fifth material, works with the two above specific active ingredients. It, however, does not work as quickly as diethylene glycol monomethyl ether acetate or dipropylene glycol monomethyl ether acetate in dispersing the two other active ingredients. Accordingly, it is not as desirable as diethylene glycol monomethyl ether acetate and dipropylene glycol monomethyl ether acetate.

The third active ingredient should be used in the cleaner composition in an amount to bring the total cleaner composition to one hundred percent by volume. However, the material should be no more than about 35 to about 40 percent by volume of the total cleaner composition because above 40 percent the individual ingredients reduce the effectiveness of the other active ingredients and can attack the substrate in certain circumstances.

Certain proprietary additives must be included in the cleaner composition. These additives are non-toxic materials. Specifically, a hydroxy propyl cellulose thixotropic thickening agent and a surfactant are two proprietary additives that are needed to provide preferred results. It is preferred, although not necessary, that the cleaner composition contain a third proprietary additive in order to abate odor.

The thickening agent is needed to insure that the cleaner is kept on the surface to be treated when the surface is sloping or vertical or the cleaner is applied to the underside of a horizontal surface. Basically, the thickening agent makes certain that the surface retains the cleaner.

The preferred hydroxy propyl cellulose thixotropic thickening agent, is commonly sold under the name Klucel H, and is made available by Aqualone Company. This particular thickening agent is preferred because it is compatible with both active ingredients. Specifically, it has found to have excellent solubility with both of the active ingredients.

Klucel H should be present in an amount between about 0.5 to about 1.0 percent by volume of the total cleaner composition. In the preferred cleaner composition, it should be present in an amount of about 0.75 percent by volume of the cleaner composition.

The second proprietary additive is a surfactant. While a specific surfactant is not needed, ethoxylated nonyl phenol, which is also known as Tritan N-100 or x-100, is preferred. The amount of ethoxylated nonyl phenol is between about 1.6 to about 2.4 percent by volume of the total cleaner composition. However, it should be present in an amount about 2.00 percent by volume in the preferred cleaner composition. It has been found that the surfactant will lose or diminish its water affinity properties should the amount of the surfactant be below 1.6 percent, while the surfactant will lose or diminish its solvent affinity should the amount of the surfactant be above 2.4 percent.

While the third proprietary additive is not needed for the cleaner to treat effectively the surface, it is needed to abate the otherwise strong odors of the cleaner. The preferred third proprietary additive is amyl acetate. Amyl acetate is also known as banana oil, and is present in the preferred cleaner composition in an amount about 0.20 percent by volume of the total composition.

When small amounts of surface area are to be cleaned, the total cleaner composition is often best utilized by dispersing same in a spray. Accordingly, a propellant is needed.

It has been found that carbon dioxide is the preferred propellant since it is a non-flammable propellant. To the above cleaner composition, the propellant is added in amount between about two (2) to about four (4) percent so that the propellant constitutes about two (2) to about four (4) percent and the total cleaner composition is ninety-six (96) to about ninety-eight (98) percent of the resultant spray composition.

It will be appreciated that the amount of each component of the cleaner will vary within the range set forth above depending upon the particular application. In a preferred embodiment, the cleaner, which is particularly adaptable for removal of graffiti typically applied by various spray paints, contains the preferred ingredients set forth above.

The cleaner composition has a vapor pressure of between about 85 to about 100 psig at seventy degrees Fahrenheit. Further, the specific gravity of the cleaner is 1.060. The cleaner is water soluble, has a pale yellow appearance and has a somewhat fruity fragrance. Moreover, the cleaner is non-flammable Due to the cleaner's water solubility, it can be rinsed or washed off with water.

It has been found that the cleaner has a V.O.C. rating well below 0.1 as measured by present U.S. Government E.P.A. and O.S.H.A. standards. Accordingly, this cleaner is exempt from existing regulations regarding toxicity and V.O.C. levels.

After application, the cleaner is permitted to react for a period of from one (1) to about five (5) minutes on graffiti protective coated surfaces and about thirty (30) to about forty-five (45) minutes on untreated graffiti bearing surfaces.

The cleaner is applied in the typical fashion by application onto the graffiti on the surface using a roller, a brush or a spray. Aerosol spraying, however, is the preferred method of application for small surface areas to be cleaned. When applied by aerosol spray, the cleaner initially provides a foam on the surface to be cleaned.

With any type application, the cleaner should be left on the surface for a minimum from about one (1) to about five (5) minutes to a maximum of about one (1) hour. The cleaner and the underlying graffiti is then easily removed from non-porous surfaces. It has been found that the cleaner is effective in removing most, if not all, types of graffiti without attacking an underlying surface. The cleaner has been found particularly effective on non-porous surfaces, such as aluminum, steel, treated wood and certain masonite-type compositions.

The cleaner is applied to the surface at a thickness which is determined by the amount and the number of coatings of graffiti on the surface or substrate to be cleaned. The number of coats of the cleaner depends on the age of the graffiti and the type of the substrate under the graffiti.

The present cleaner removes graffiti from certain desired protective coated or painted surfaces without damage to that protective coat and without altering the surface. Further, the cleaner shall remove unwanted paint and graffiti from an untreated surface without damage to the surface. Basically, the cleaner acts to remove all graffiti and all non-protective coatings from a surface, although for non-protective coated surfaces, especially when the substrate is porous, a water pressure washer maybe needed to flush out emulsified paint and excess cleaner.

When used to clean or remove finish from furniture, the composition is applied as provided above. The cleaner emulsifies, and thus removes, the finish (and unwanted vanish, stains and paint) from the furniture. The furniture that can be treated is wood, metal and masonry furniture. The cleaner has not, however, been found effective for plastics and fabric.

The following examples serve to illustrate certain preferred forms of the cleaner composition of the present invention.

| Ingredient | Amount (% by weight) | Type of ingredient |
|---|---|---|
| EXAMPLE 1 | | |
| N-methylpyrrolidone | 20 to 40 | active |
| Propylene carbonate | 20 to 50 | active |
| Klucel H | 0.50 to 1.00 | thickening agent |
| Ethoxylated nonyl phenol | 1.60 to 2.40 | surfactant |
| Isocetyl alcohol | q.s. | active |
| Other | 0.20 | additive |
| EXAMPLE 2 | | |
| N-methylpyrrolidone | 32.0 | active |
| Propylene carbonate | 31.8 | active |
| One of the four specific glycols | 33.25 | active |
| Klucel H | 0.75 | thickening agent |
| Ethoxylated nonyl phenol | 2.0 | surfactant |
| Other | 0.20 | additive |

The additive(s) in both examples preferably is amyl acetate which is used to abate odor.

Having thus described the invention with particular reference to the preferred forms thereof, it will be obvious that various changes and modifications may be made therein without departing from the spirit and scope of the invention as defined by the appended claims.

Wherefore, I claim:

1. A cleaner for removing graffiti, paint and other coatings from a surface, said cleaner comprising:
   (a) N-methylpyrrolidone in an amount between about 20 to about 40 percent by volume of said cleaner;
   (b) propylene carbonate in an amount between about 20 to about 50 percent by volume of said cleaner;
   (c) a hydroxy propyl cellulose thixotropic thickening agent in an effective amount;
   (d) a dispersing ingredient which is selected from the group consisting of dipropylene glycol monomethyl ether acetate and dipropylene glycol methyl ether;
   (e) isocetyl alcohol, wherein said isocetyl alcohol and said dispersing ingredient are present in an amount which totals no more than 40 percent by volume of said cleaner; and
   (f) a surfactant in an amount between about 1.6 to about 2.4 percent by volume of said cleaner.

2. The cleaner of claim 1, wherein said dispersing ingredient is an ingredient selected from the group consisting of diethylene glycol monoethyl ether acetate, dipropylene glycol monomethyl ether acetate, dipropylene glycol methyl ether and diethylene glycol ethyl ether.

3. The cleaner of claim 1, wherein said N-methylpyrrolidone is in an amount of about 32.00 percent of said cleaner.

4. The cleaner of claim 1, wherein said dispersing ingredient is present in an amount of about 33.25 percent of said cleaner.

5. The cleaner of claim 1, wherein said propylene carbonate is in an amount of about 31.8 percent of said cleaner.

6. The cleaner of claim 1, wherein said surfactant is ethoxylated nonyl phenol.

7. The cleaner of claim 6, wherein said ethoxylated nonyl phenol is in an amount of 2.00 percent by weight of said cleaner.

8. The cleaner of claim 1, wherein said thickening agent is in an amount between about 0.50 to about 1.00 percent by volume of about said cleaner.

9. The cleaner of claim 1, wherein said thickening agent is in an amount of about 0.75 percent by volume of said cleaner.

10. The cleaner of claim 1, further comprising amyl acetate.

11. The cleaner of claim 10, wherein said amyl acetate is in an amount between about 0.10 to about 0.20 percent by volume of said cleaner.

12. The cleaner of claim 10, wherein said amyl acetate is in an amount of about 0.20 percent by volume of said cleaner.

13. A cleaner for removing graffiti, paint and other coatings from a surface, said cleaner comprising:
   (a) N-methylpyrrolidone in an amount between about 20 to about 40 percent by volume;
   (b) propylene carbonate in an amount between about 20 to about 50 percent by volume;
   (c) a dispersing ingredient selected from the group consisting of dipropylene glycol monomethyl ether acetate and dipropylene glycol methyl ether;
   (d) isocetyl alcohol, wherein said isocetyl alcohol and said isocetyl alcohol and said dispersing ingredient total an amount up to about 40 percent by volume;
   (e) ethoxylated nonyl phenol in an amount between about 1.6 to about 2.4 percent by volume;
   (f) hydroxy propyl cellulose thixotropic thickening agent in an amount between about 0.50 to about 1.00 percent by volume in said cleaner.

14. A cleaner for removing graffiti, paint and other coatings from a surface, said cleaner comprising:
   (a) a first active ingredient, said first active ingredient being N-methylpyrrolidine in an amount about 32.00 percent by volume;
   (b) a second active ingredient, said second active ingredient being propylene carbonate in an amount about 31.8 percent by volume;
   (c) a dispersing ingredient selected from the group consisting of dipropylene glycol monomethyl ether acetate and dipropylene glycol methyl ether;
   (d) isocetyl alcohol, wherein said isocetyl alcohol and said dispersing ingredient total an amount up to about 40 percent by volume;
   (e) a hydroxy propyl cellulose thixotropic thickening agent in an amount about 2.00 percent by volume;
   (f) a surfactant, said surfactant being ethoxylated nonyl phenol in an amount about 0.75 percent by volume; and
   (g) amyl acetate in an amount about 0.20 percent by volume of said cleaner.

* * * * *